United States Patent Office 3,079,414
Patented Feb. 26, 1963

3,079,414
METHOD OF PREPARING HETEROCYCLIC COMPOUNDS CONTAINING METALS OR METALLOIDS
Christ Tamborski, Dayton, Ohio, and Henry Gilman, Ames, Iowa; said Gilman assignor to the United States of America as represented by the Secretary of the Air Force
No Drawing. Filed Sept. 18, 1959, Ser. No. 840,986
17 Claims. (Cl. 260—429)

In the co-pending application, Serial No. 770,900, filed October 30, 1958, now abandoned, in the names of Henry Gilman and Christ Tamborski, there are disclosed a new class of silicon containing heterocycles especially useful as antioxidants and antiwear additives for use in lubricating oils, greases and hydraulic fluids suitable for use at high temperatures. In the prior application in addition to the new compounds a method of synthesizing the compounds is also disclosed.

In accordance with the present invention we have discovered an improved method of making silicon containing heterocycles and in addition have found a method of synthesis by which other elements may be substituted for silicon. The compounds, in accordance with the present invention, relate to the preparation of novel chemical species which function as antioxidants and antiwear additives in base materials such as fluids, greases, elastomers and resins. The primary features of these materials are that they will render the base materials operational at high temperatures due to their oxidative inhibition. The general classes of compounds in accordance with the present invention are metallic or metalloidal containing heterocyclic compounds. The structure of this general class of compounds is as follows:

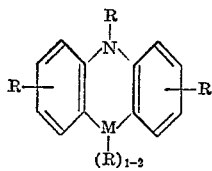

(Structure A)

where R's can be equal or dissimilar, M is a metal or metalloid of group III, IV, or V of the periodic table, R represents a member of the class consisting of H, aryl, alkaryl, alkyl, or arylalkyl groups.

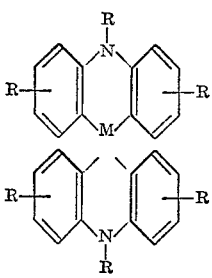

(Structure B)

where M and R may be members as exemplified in Structure A. Compounds of the character indicated above under Structure B are not disclosed in the original application, Serial No. 770,900. In accordance with the present invention the new approach to the synthesis of compounds of either of Structures A or B above are disclosed. The heterocyclic compounds in accordance with either Structure A or Structure B above can generally be prepared by the reaction of a dihalodiarylamine such as a 2,2′-dibromo-diphenylamine with butyl lithium in either solution. The intermediate 2,2′-dilithio-diphenylamine formed by the initial reaction is then reacted with the appropriate metallic or metalloidal halide and stirred at room temperature for approximately twenty-four hours. The reaction mixture is suitably worked up by fractional crystallization to yield the desired products.

The following examples are given by way of illustration and not by way of limitation.

A. *Example for Structure A*

(1) 5-ethyl-10, 10-diphenylphenazasiline. To 5.05 gm. (0.014 mole) of N-ethyl-2, 2′-dibromodiphenylamine in 50 ml. of ether, there was added 0.028 mole of n-butyllithium, in two equal parts (10 minutes apart), while cooling the reaction flask in an ice bath. After stirring under these conditions for one hour the metal halogen interchange was complete. To the above cooled solution, there was added 3.60 gm. (0.014 mole) of diphenyldichlorosilane in 100 ml. of ether. The reaction mixture was stirred at room temperature for 28 hours. The reaction mixture was hydrolyzed and the organic layer was dried. After removing the solvent, the desired product was obtained by recrystallization from petroleum ether. The yield of product was 58% and the melting point was 121–123° C. Elemental analysis and infra-red spectra confirmed the structure of the compound.

Using the same experimental procedures, employing the same molar ratios as shown in Example 1, the following compounds were prepared from N-ethyl 2,2′ dilithio-diphenylamine.

| | $R_2MCl_2$ | Percent Yield | M.P., °C. | Compound |
|---|---|---|---|---|
| 1 | $(C_6H_5)_2SiCl_2$ | 58 | 121–123 | 5-ethyl-10,10-diphenyl-phenazasiline. |
| 2 | $(C_6H_5)_2GeCl_2$ | 52 | 120–121 | 5-ethyl-10,10-diphenyl-phenazagermine. |
| 3 | $(C_6H_5)_2SnCl_2$ | 34 | 117–119 | 5-ethyl-10,10-diphenyl-phenazastannine. |
| 4 | $(C_6H_5)_2PbCl_2$ | 26 | 121.5–123 | 5-ethyl-10,10-diphenyl-phenazaplumbine. |
| 5 | $C_6H_5Si(CH_3)Cl_2$ | 72 | 62–64 | 5-ethyl-10-methyl-10-phenylphenazasiline. |

Using the same experimental procedures, employing the same molar ratios as shown in Example 1, the following compound was prepared from N-methyl-2,2′-dilithio-di-p-tolylamine.

| | $R_2MCl_2$ | Percent Yield | M.P., °C. | Compound |
|---|---|---|---|---|
| 6 | $(C_6H_5)_2SiCl_2$ | | 163–165 | 2,5,8-trimethyl-10,10-diphenylphenazasiline. |

B. *Example for Structure B (Spiro Structure)*

(7) The preparation of 5,5′-diethyl-10,10′-spirobiphenazasiline. To a solution of 10.65 gm. (0.03 mole) of N-ethyl-2,2′ dibromodiphenylamine in 100 ml. of ether cooled in an ice bath, there was added 0.06 mole of n-butyllithium over a period of 10 minutes. After stirring for 40 minutes, 2.55 gm. (0.015 mole) of freshly distilled $SiCl_4$ in 100 ml. of ether was added and the ether solution was refluxed for 18 hours. One hundred ml. of toluene was then added and the ether distilled off. The resulting toluene suspension was refluxed for 2 hours. After hydrolysis, the organic layer was separated and dried. After distilling the solvent, the desired product was obtained by recrystallization from ethyl acetate. The yield of product was 44.4% and the M.P. was 215.5–217° C. Elemental analysis and infra-red analysis confirmed the structure.

Using the same experimental details, employing the same molar ratios as shown in Example 7, the following compounds were prepared from N-ethyl-2,2'-dilithio-diphenylamine.

|  | R₂MCl₂ | Percent Yield | M.P., °C. | Compound |
|---|---|---|---|---|
| (7) | SiCl₄ | 44.4 | 215.5–217 | 5,5'-diethyl-10,10-spirobiphena-asiline. |
| (8) | GeCl₄ | 18.1 | 212–214 | 5,5'-diethyl-10,10'-spirobiphenaza-germine. |
| (9) | SnCl₄ | 28.5 | 210–211 | 5,5'-diethyl-10,10'-spirobiphenaza-stannine. |

In accordance with the present invention yields depending upon the particular metal or metalloidal compound employed will extend as high as 72% as distinguished from the much lower yield capable of being produced in accordance with the prior disclosure in application Serial No. 770,900.

In addition the method is more flexible in that metal and metalloid compounds other than silicon can be introduced into the heterocyclic structure.

We claim:

1. A method of preparing a heterocyclic compound comprising the steps of mixing a material selected from the group consisting of 2,2'-dibromodiphenylamine, N-methyl - 2,2' - dibromodiphenylamine, N - ethyl - 2,2'-dibromodiphenylamine, and N-methyl-2,2'-dibromo-di-p-tolylamine with a solution of butyl lithium to yield an intermediate reaction product and mixing said intermediate reaction product with a compound having the following structural formula:

$$R_2MX_2$$

where M represents a member selected from the group consisting of silicon, germanium, tin, and lead; R represents a member selected from the group consisting of a methyl, a phenyl, and a halogen; and X represents a halogen.

2. A method of preparing a heterocyclic compound comprising the steps of mixing N-ethyl-2,2'-dibromo-diphenylamine with a solution of butyl lithium to yield an intermediate reaction product and mixing said intermediate reaction product with diphenyl dichlorosilane.

3. A method of preparing a heterocyclic compound comprising the steps of mixing N-methyl-2,2'-dibromo-di-p-tolylamine with a solution of butyl lithium to yield an intermediate reaction product and mixing said intermediate reaction product with diphenyl dichlorosilane.

4. As a compound, 5-ethyl-10,10-diphenylphenazagermine.

5. As a compound, 5-ethyl-10,10-diphenylphenazastannine.

6. As a compound, 5-ethyl-10,10-diphenylphenazaplumbine.

7. As a compound, 2,5,8-trimethyl-10,10-diphenylphenazasiline.

8. As a compound, 5,5'-diethyl-10,10'-spirobiphenazasiline.

9. As a compound, 5,5'-diethyl-10,10'-spirobiphenazagermine.

10. As a compound, 5,5'-diethyl-10,10'-spirobiphenazastannine.

11. A method of preparing a heterocyclic compound comprising the steps of mixing N-ethyl-2,2'-dibromodiphenylamine with a solution of butyl lithium to yield an intermediate reaction product and mixing said intermediate reaction product with diphenyl dichlorogermine.

12. A method of preparing a heterocyclic compound comprising the steps of mixing N-ethyl-2,2'-dibromodiphenylamine with a solution of butyl lithium to yield an intermediate reaction product and mixing said intermediate reaction product with diphenyl dichlorostannine.

13. A method of preparing a heterocyclic compound comprising the steps of mixing N-ethyl-2,2'-dibromodiphenylamine with a solution of butyl lithium to yield an intermediate reaction product and mixing said intermediate reaction product with diphenyl dichloroplumbine.

14. A method of preparing a heterocyclic compound comprising the steps of mixing N-ethyl-2,2'-dibromodiphenylamine with a solution of butyl lithium to yield an intermediate reaction product and mixing said intermediate reaction product with methylphenyl dichlorosilane.

15. A method of preparing a heterocyclic compound comprising the steps of mixing N-ethyl-2,2'-dibromodiphenylamine with a solution of butyl lithium to yield an intermediate reaction product and mixing said intermediate reaction product with silicon tetrachloride.

16. A method of preparing a heterocyclic compound comprising the steps of mixing N-ethyl-2,2'-dibromodiphenylamine with a solution of butyl lithium to yield an intermediate reaction product and mixing said intermediate reaction product with germanium tetrachloride.

17. A method of preparing a heterocyclic compound comprising the steps of mixing N-ethyl-2,2'-dibromodiphenylamine with a solution of butyl lithium to yield an intermediate reaction product and mixing said intermediate reaction product with tin tetrachloride.

References Cited in the file of this patent

UNITED STATES PATENTS 2,160,915   Schreiber _____ June 6, 1939

OTHER REFERENCES

Hitchcock et al.: J. Chem. Soc. (1957), pp. 4537–46.
Gilman: J. Am. Chem. Soc., vol. 79, pp. 6339–40 (1957).
Gilman et al.: Chemistry and Industry, 1958, page 1227.